United States Patent [19]

Pitrat

[11] 4,161,993
[45] Jul. 24, 1979

[54] SAFETY-TYPE DASHBOARD CONTROL FOR CHOKE OR THE LIKE

[75] Inventor: Alain Pitrat, Mours Saint-Eusèbe, France

[73] Assignee: Societe Anonyme des Equipements S.E.I.M., Romans, France

[21] Appl. No.: 838,759

[22] Filed: Oct. 3, 1977

[30] Foreign Application Priority Data

Oct. 1, 1976 [FR] France .................................. 76 30655

[51] Int. Cl.² ............................................. B60K 37/06
[52] U.S. Cl. ..................................... 180/90; 74/501 R
[58] Field of Search ............................. 180/90, 77 R; 123/119 F; 74/482, 501 R

[56] References Cited

U.S. PATENT DOCUMENTS

| | | | |
|---|---|---|---|
| 2,287,674 | 6/1942 | Fairbanks | 74/501 X |
| 3,182,162 | 5/1965 | Gelfand et al. | 180/90 X |
| 3,798,994 | 3/1974 | Hollins | 180/90 X |
| 4,051,916 | 10/1977 | Oda | 180/90 |

Primary Examiner—Richard A. Bertsch
Assistant Examiner—Michael Mar
Attorney, Agent, or Firm—Karl F. Ross

[57] ABSTRACT

The core of a bowden cable controlling an automobile choke or the like is connected to the rear end of a rod longitudinally displaceable in a guide mounted in the automobile dashboard with the front end of the rod carrying a control knob that normally projects from the dashboard. The rod normally is moved forwardly to operate the choke from an intermediate position with its rear end bearing on inwardly projecting portions of laterally elastically deflectable fingers formed integrally with the guide. If the control knob is forcibly depressed the rear end will deflect the portions and fingers laterally and allow the control knob to move against the dashboard out of harm's way.

10 Claims, 4 Drawing Figures

U.S. Patent
Jul. 24, 1979
4,161,993
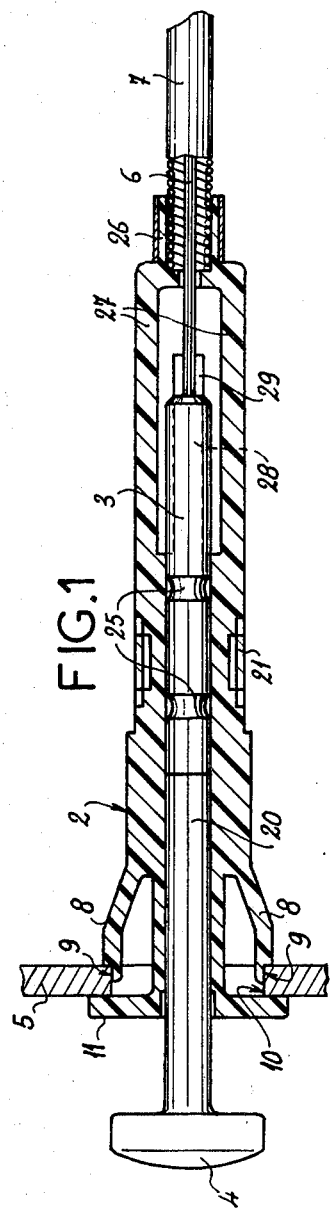
FIG.1
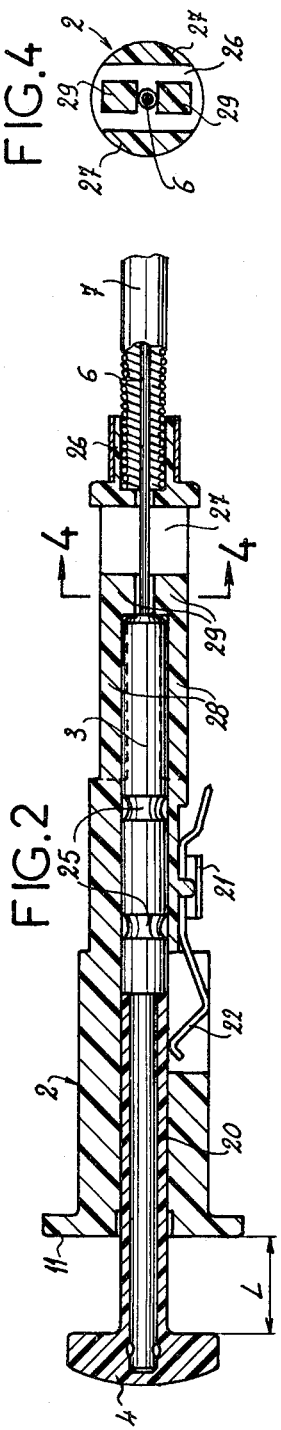
FIG.2
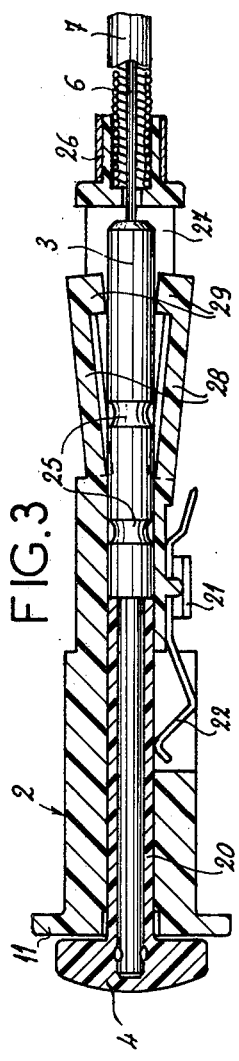
FIG.3
FIG.4

SAFETY-TYPE DASHBOARD CONTROL FOR CHOKE OR THE LIKE

FIELD AND BACKGROUND OF THE INVENTION

The present invention relates to a remote control, in particular for an automobile vehicle choke flap, of the type comprising a fixed member in the form of a sleeve in which a movable rod connected to a control knob is slidably mounted, the fixed member being made from plastics material and comprising, at its front end, securing lugs projecting laterally and which can be engaged on the edge of an aperture provided in the vehicle dash-board. This known arrangement is replacing the conventional method of attachment to the dash-board by screwing to an increasing extent and it facilitates simplification and therefore savings in the construction and assembly of the remote control.

OBJECTS OF THE INVENTION

The object of the present invention is to provide an improvement to this type of remote control intending to facilitate the retraction of the control knob which constitutes a projecting part and could be dangerous, in the case of frontal impact. More precisely, it intends to eliminate this danger by making use of the elasticity of the fixed member, made from plastics material as above-mentioned, in order to obtain the retraction of the control knob under the action of a sufficiently strong frontal pushing force, with the possibility of re-setting, i.e. repositioning after an impact which has caused its retraction.

SUMMARY OF THE INVENTION

To this end, the fixed member or guide of plastics material of the remote control according to the present invention, comprises, in its rear part, i.e. the part opposite the securing lugs, at least one other resilient finger or tongue normally forming an abutment for the movable rod integral with the control knob, when the latter is located in the intermediate position where it has not been pulled, but is able to move aside to facilitate an additional withdrawal of said rod, in the case of impact.

According to a preferred embodiment of the invention, the member of plastics material comprises, in its rear part, two resilient tongues which are diametrically opposed with respect to the movable rod, able to move apart to facilitate the withdrawal of said rod.

According to one embodiment, each resilient tongue comprises a first part or finger, connected to the remainder of the fixed member of plastics material and another part or portion of larger section than the first, located at the end of the tongue, directed towards the movable rod and forming an abutment for the latter.

Under the action of a sufficiently strong frontal pushing force, the movable rod whose rear end is in abutment against the parts of larger section of the resilient tongues, separates the latter and may move back until the control knob, integral with said rod, is retracted. Resetting of the knob takes place simply by pulling the latter forwards, which enables the movable rod and resilient tongues to return to their normal position. These tongues are moulded in one piece with the remainder of the member of plastics material, without it being necessary to attach any part.

BRIEF DESCRIPTION OF THE DRAWING

However, the invention will be better understood by means of the ensuing description, referring to the accompanying diagrammatic drawings illustrating, as a non-limiting example, one embodiment of this remote control;

FIG. 1 is a side view, in longitudinal section, of the remote control according to the invention;

FIG. 2 is another view of the latter in longitudinal section taken through a plane forming a right-angle with the plane of the section of FIG. 1;

FIG. 3 is a sectional view similar to FIG. 2, showing this remote control after depression of the control knob;

FIG. 4 is a view of the latter in cross-section, on plane 4—4 of FIG. 2.

SPECIFIC DESCRIPTION

These various Figures illustrate a remote control as may be provided in the case of an automobile vehicle choke flap, although the invention is not limited to this application.

In known manner, this control comprises a fixed part constituted by a member 2 in the form of a sleeve and a movable part constituted by a rod 3, connected to a control knob 4 and mounted to slide inside the member 2.

The arrangement is fixed to a dash-board 5 shown solely in FIG. 1.

The knob 4 is used to control the movements of a moving member, choke flap or the like, by means of a cable or 'piano wire' 6 fixed to the rear end of the rod 3 i.e. to the end of the latter remote from the control knob 4. The cable 6 is mounted to slide in a sheath 7 connected to the rear end of the member 2.

The member 2 is constituted by a single molded part of plastics material. Its front end, intended to be fixed to the dash-board 5, therefore comprises two securing lugs 8. Located on either side of the rod 3, these two lugs diverge from the latter in the direction of the control knob 4. They are each formed with a notch 9 close to their end.

A rectangular or square aperture 10 is provided in the dash-board 5. The attachment of the member 2 is achieved by engagement of the notches 9 of the lugs 8 onto opposite edges of the aperture 10, for example, the upper and lower edges, as shown in FIG. 1. This attachment is reinforced by two lateral projections 11, integral with the member 2, which come into contact with the dash-board 5, which is thus sandwiched therebetween.

Owing to the elasticity of the lugs 8 and their inclination with respect to the rod 3, the assembly is effected very easily by engaging the control arrangement in the aperture 10. The rectangular or square shape of the latter facilitates easy and accurate positioning.

In the example illustrated, as shown particularly in FIG. 2, depending on its position, the knob 4 controls not only the movements of a mechanical member, such as the choke flap, but also the opening and closing of an electrical control circuit, for example a circuit comprising an indicator light which iluminates when the knob 4 has been pulled.

In order that the knob 4 has the function of a switch, the rod 3 is constituted by a metal shaft, which therefore conducts electricity and is covered over part of its length by an insulating sheath 20 formed by an extension of the knob 4.

Two lugs 21 integral with the member 2 facilitate attachment by clipping of a fixed electrical contact 22, formed by a spring strip pressing against the rod 3. Depending on the position of the knob 4, this contact 22 presses either on the grounded metal shaft of the rod 3 and thus closes the electrical circuit, or on the insulating sheath 20, which opens the electrical circuit.

The rod 3 comprises two grooves 25 in which the end of the spring strip 22 may engage, which makes it possible to arrest the control knob 4 in a first position in which it has been partly pulled and a second position in which it has been pulled completely.

According to the present invention, in its rear part, the member 2 has a particular configuration making it possible to obtain retraction of the control knob 4 in the case of frontal impact. The rear end 26 of the member 2, to which the sheath 7 is connected, is connected to the central part of said member by two substantially parallel plates 27, between which two resilient tongues 28 extend.

These two tongues 28 extend parallel to the rod 3 and are diametrically opposed with respect to the latter. Each tongue 28 comprises a first part whose front end is connected to the member 2 and another part 29 of larger section than the former, located at the rear end of the tongue and directed toward the rod 3.

As shown in FIGS. 2 and 4, the two parts 29 are normally adjacent each other in order to leave a free passage for the cable 6 but to form an abutment for the rear end of the rod 3, when the control knob 4 is in the position where it has not been pulled, such that the rod is arrested in a positive manner.

In the case of frontal impact, the pushing force exerted on the rod 3 enables the latter to separate the two parts 29, owing to the frustoconical shape of the rod 3 at its end, forming an inclined ramp and owing to the elasticity of the tongues 28 which are made, like the remainder of the member 2, from plastics material. The two separated parts slide along the rod 3 and the latter may thus move, between the two plates 27, until the control knob 4 has moved in by a length L. FIG. 3 shows the position of the rod 3, of the control knob 4 and of the two tongues 28 after complete depression of the knob 4.

Resetting of the knob 4, i.e. respositioning of the latter after an impact has caused its depression, takes place simply by pulling the latter forward, which enables the rod 3 and the resilient tongues 28 to return to their normal position, i.e. their position shown in FIGS. 2 and 4.

Naturally, the invention is not limited to the single embodiment of this remote control which has been described above by way of example. On the contrary, it includes all variations of construction and applicaion, whatever the number of the resilient tongues and the nature of the controlled member.

I claim:

1. A control assembly for a controlled element displaceable longitudinally with respect to a support, said assembly comprising:
   a guide secured to said support and defining a longitudinally extending guide passage, said guide having a laterally elastically deflectable finger having an abutment portion normally lying in said passage but laterally elastically deflectable out of said passage;
   a longitudinally extending rod having a rear end connectable for joint longitudinal displacement with said controlled element and bearing longitudinally backwardly on said portion in an intermediate position and a front end, said rod being displaceable forwardly from said intermediate position away from said portion for adjustment of said controlled element and being displaceable backwardly from said intermediate position with lateral elastic deflection of said portion on forcible backward depression of said front end; and
   a control knob on said front end spaced from said support in said intermediate position of said rod.

2. The assembly defined in claim 1 wherein said guide is generally tubular and has a pair of such fingers and portions oppositely transversely flanking said rod.

3. The assembly defined in claim 1 wherein said guide and said finger are unitarily made of elastically deformable plastic material.

4. The assembly defined in claim 1, further comprising switch means movable between a closed position and an open position on displacement of said rod forwardly out of said intermediate position.

5. The assembly defined in claim 4 wherein said rod is at least partially of conductive material and carries over part of its length an insulating sleeve, said switch means including a 6. The assembly defined in claim 5 wherein said sleeve is integral with said knob.

7. The assembly defined in claim 5 wherein said rod is formed with at least one outwardly and laterally open notch, said contact being resiliently engageable in said notch when said rod is forward of said intermediate position in a predetermined forward position.

8. The assembly defined in claim 7 wherein said rod is formed with two such notches spaced longitudinally apart and each defining a respective forward position.

9. The assembly defined in claim 7 wherein said rod is formed with at least one groove forming said notch.

10. The assembly defined in claim 1 wherein said controlled member is the core of a bowden cable having a sheath fixed to said guide.

* * * * *